UNITED STATES PATENT OFFICE.

JAMES T. MORGAN, OF WINSTED, AND HUBERT W. MORGAN, OF MERIDEN, CONNECTICUT.

PRESERVATIVE PAPER.

SPECIFICATION forming part of Letters Patent No. 372,861, dated November 8, 1887.

Application filed May 24, 1887. Serial No. 239,223. (No specimens.)

*To all whom it may concern:*

Be it known that we, JAMES T. MORGAN, of Winsted, in the county of Litchfield and State of Connecticut, and HUBERT W. MORGAN, of Meriden, in the county of New Haven and State of Connecticut, have invented a new and useful Improvement in Preservative Paper, of which the following is a full, clear, and exact description.

The object of our invention is to improve the preservative paper for which Letters Patent No. 223,814 were granted to J. C. Pennington January 27, 1880.

The design of our invention is to provide a preserving-paper adapted for inclosing silverware and other metallic goods, to protect them against the action of sulphureted hydrogen and other gases injurious to polished metal, and which is also useful in preserving meats, fruits, eggs, &c.

In carrying out our invention we take one pound of borax, one pound of sal-soda, and of any non-poisonous caustic alkali (such as caustic soda) eight pounds. We dissolve these ingredients in water and reduce the solution until it has a density of 30° Baumé. We then take one part of oxide of iron rendered neutral and three parts of oxide of tin or zinc, and boil the whole together, either with or without pressure, until the alkaline solution has taken up and dissolved as much of the metallic oxide as it is capable of holding in solution. We then reduce the solution with water until it has a density of about 12° Baumé, and while it is yet warm we add a small amount of gluten or analogous material. This solution we allow to stand until it becomes quite clear. It is then drawn off for use and placed in a vat.

The preservative paper is prepared by first passing it through the above-described solution, then through calendering-rolls while still moist, thus closing the fibers of the paper and giving it a finely-finished or calendered surface. The calendering also closes the pores of the paper, so as to render it more impervious to gases.

Our improved preservative paper is adapted for preserving metals from tarnishing; for preserving all kinds of meat, fruit, eggs, vegetables, &c.; for carpet-lining for protection against vermin, and for hanging in the rooms of dwellings as a disinfectant. The paper is also used in the manufacture of boxes, caskets, and cases for containing perishable articles.

Having thus fully described our invention, we claim as new and desire to secure by Letters Patent—

A solution for saturating preservative paper, consisting of the following ingredients, combined in about the proportions named: borax, sal-soda, caustic alkali, oxide of iron, oxide of tin, or its described equivalent, gluten, and water, substantially as specified.

JAMES T. MORGAN.
HUBERT W. MORGAN.

Witnesses:
A. P. BROWN,
GEORGE ROUVIERE.